United States Patent
Gupta et al.

(10) Patent No.: US 10,683,173 B2
(45) Date of Patent: Jun. 16, 2020

(54) METHOD OF MANAGING RESOURCES IN A WAREHOUSE

(71) Applicant: GREY ORANGE PTE. LTD., Singapore (SG)

(72) Inventors: Akash Gupta, New Delhi (IN); Samay Kohli, New Delhi (IN); Wolfgang Kurt Hoeltgen, Laatzen (DE); Srijan Choudhary, Bilaspur (IN)

(73) Assignee: GREY ORANGE PTE. LTD., Singapore (SG)

( * ) Notice: Subject to any disclaimer, the term of this patent is extended or adjusted under 35 U.S.C. 154(b) by 0 days.

(21) Appl. No.: 15/769,792

(22) PCT Filed: Oct. 24, 2016

(86) PCT No.: PCT/IB2016/001607
§ 371 (c)(1),
(2) Date: Apr. 20, 2018

(87) PCT Pub. No.: WO2017/068420
PCT Pub. Date: Apr. 27, 2017

(65) Prior Publication Data
US 2019/0266552 A1   Aug. 29, 2019

(30) Foreign Application Priority Data
Oct. 22, 2015   (SG) .............................. 10201508737S

(51) Int. Cl.
*B65G 1/16*   (2006.01)
*G06Q 10/08*   (2012.01)
(Continued)

(52) U.S. Cl.
CPC ............. *B65G 1/16* (2013.01); *B65G 1/0492* (2013.01); *B65G 1/1371* (2013.01);
(Continued)

(58) Field of Classification Search
CPC ....................................................... B65G 1/16
See application file for complete search history.

(56) References Cited

U.S. PATENT DOCUMENTS

| | | | |
|---|---|---|---|
| 6,266,649 B1 * | 7/2001 | Linden ............. | G06Q 10/08345 705/14.51 |
| 7,966,334 B1 * | 6/2011 | Bezos ................... | G06Q 30/06 707/748 |

(Continued)

FOREIGN PATENT DOCUMENTS

| WO | WO 2014/077819 A1 | 5/2014 | |
|---|---|---|---|
| WO | WO-2014077819 A1 * | 5/2014 | ........... B65G 1/0407 |

OTHER PUBLICATIONS

International Search Report dated May 18, 2017, in PCT/IB2016/001607, filed Oct. 24, 2016.
(Continued)

*Primary Examiner* — Thomas Randazzo
(74) *Attorney, Agent, or Firm* — Oblon, McClelland, Maier & Neustadt, L.L.P.

(57) ABSTRACT

Described herein is an apparatus and method for selecting a storage location for an item. The method includes obtaining order information for a plurality of previously fulfilled orders, wherein each order includes at least one item. Based on the obtained order information, one or a combination of an affinity value of the item and a popularity value of the item are computed. The method determines available storage locations in a plurality of storage racks, each rack including at least one shelf. Further, the method computes for each available storage location, one or a combination of an affinity score and a popularity score of the storage rack with respect to the item. The method selects the storage location from the available storage locations based on at least one of the calculated affinity score and the calculated
(Continued)

popularity score, and instructs a vehicle to store the item at the selected storage location.

21 Claims, 10 Drawing Sheets

(51) Int. Cl.
  *G06Q 30/06* (2012.01)
  *B65G 1/04* (2006.01)
  *B65G 1/137* (2006.01)
  *G06Q 30/02* (2012.01)
(52) U.S. Cl.
  CPC ......... *B65G 1/1373* (2013.01); *G06Q 10/087* (2013.01); *G06Q 10/0838* (2013.01); *G06Q 30/0201* (2013.01); *G06Q 30/0639* (2013.01)

(56) References Cited

U.S. PATENT DOCUMENTS

| | | | | |
|---|---|---|---|---|
| 8,001,141 | B1* | 8/2011 | Bar | G06Q 30/06 |
| | | | | 707/769 |
| 8,560,461 | B1 | 10/2013 | Tian et al. | |
| 8,645,221 | B1 | 2/2014 | Sarma | |
| 9,487,356 | B1* | 11/2016 | Aggarwal | B64C 39/024 |
| 10,147,129 | B1* | 12/2018 | Shang | G06Q 30/0631 |
| 2004/0093286 | A1* | 5/2004 | Cooper | G06Q 10/087 |
| | | | | 705/28 |
| 2005/0102186 | A1 | 5/2005 | Buil | |
| 2007/0021864 | A1* | 1/2007 | Mountz | G06Q 10/087 |
| | | | | 700/216 |
| 2008/0270398 | A1* | 10/2008 | Landau | G06Q 30/02 |
| 2009/0082902 | A1* | 3/2009 | Foltz | G06Q 10/087 |
| | | | | 700/214 |
| 2009/0202155 | A1 | 8/2009 | Hayashi et al. | |
| 2009/0216364 | A1* | 8/2009 | Grissom | G06Q 10/087 |
| | | | | 700/214 |
| 2010/0030667 | A1* | 2/2010 | Chudy | G06F 19/3462 |
| | | | | 705/28 |
| 2011/0184806 | A1* | 7/2011 | Chen | G06K 9/6226 |
| | | | | 705/14.52 |
| 2011/0276364 | A1 | 11/2011 | Bergstrom et al. | |
| 2013/0046766 | A1* | 2/2013 | Shishido | G06Q 30/00 |
| | | | | 707/741 |
| 2013/0173049 | A1* | 7/2013 | Brunner | G06Q 10/08 |
| | | | | 700/216 |
| 2014/0100999 | A1* | 4/2014 | Mountz | G06Q 10/087 |
| | | | | 705/28 |
| 2015/0032498 | A1 | 1/2015 | Qian | |
| 2015/0248538 | A1 | 9/2015 | Van Lierde et al. | |
| 2015/0291356 | A1* | 10/2015 | Oki | B65G 1/0407 |
| | | | | 414/273 |
| 2016/0148297 | A1* | 5/2016 | Kashyap | G06Q 30/0631 |
| | | | | 705/26.7 |
| 2016/0162830 | A1* | 6/2016 | Devaiah | G06Q 10/0631 |
| | | | | 705/14.13 |
| 2017/0039513 | A1* | 2/2017 | Jones | G06Q 10/087 |
| 2017/0043953 | A1* | 2/2017 | Battles | B65G 1/1373 |

OTHER PUBLICATIONS

Extended European Search Report dated May 13, 2019 in Patent Application No. 16856988.7, 8 pages.

* cited by examiner

METHOD OF MANAGING RESOURCES IN A WAREHOUSE

CROSS-REFERENCE TO RELATED APPLICATIONS

The present application claims priority to Singapore Patent Application No. 10201508737S, filed Oct. 22, 2015, and incorporated herein by reference in its entirety.

FIELD

The present disclosure relates to management of resources and products in a warehouse.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Typically, products in a warehouse are stored in a manner such that retrieval of a particular product is not cumbersome. Primary techniques of stocking products are accomplished, for example, by storing the product alphabetically or based on a predetermined category that the product belongs to. For example, a book may be stored under the category of knowledge or education, while a product such as a shirt or a trouser may be stocked within the category of clothing articles.

Some warehouse systems analyze the history of products and orders that are processed by the system to arrive at a strategy for stocking the products. However, such systems usually stock the products at predetermined storage areas within the warehouse. Moreover, a management system that overlooks the operational procedures of such a warehouse, does not address the overheads that are incurred in terms of cost, and time spent in retrieving the stored products. In a warehouse system, each time an order is received, certain steps are required to be performed in order to fulfill the order. For example, the product has to be located and transported to a processing station where the product is processed for packaging. The transportation of the product requires a certain distance to be traversed (either by a robot or a human), which requires time and adds to the operational costs of the warehouse.

Accordingly, there is a requirement for a warehouse system that efficiently manages the storage of products in the warehouse.

SUMMARY

An aspect of the present disclosure provides for a method of selecting a storage location for an item. The method is performed by a server including circuitry, wherein the method includes the steps of: obtaining by the circuitry, order information for a plurality of previously fulfilled orders, each order of the plurality of previously fulfilled orders including at least one item; calculating, based on the obtained order information, one or a combination of an affinity value of the item, and a popularity value of the item, the affinity value of the item being calculated with respect to at least one other item; determining a plurality of available storage locations where the item can be stored, each available storage location corresponding to one of a plurality of storage racks and a position on a shelf of the one of the plurality of storage racks; calculating, for each available storage location, one or a combination of an affinity score of the storage rack corresponding to the respective available storage location with respect to the item, and a popularity score of the storage rack corresponding to the respective available storage location; selecting the storage location from the available storage locations based on at least one of the calculated affinity score of the storage rack corresponding to the selected storage location, and the calculated popularity score of the storage rack corresponding to the selected storage location; and instructing a vehicle to store the item at the selected storage location.

By one embodiment of the present disclosure is provided an information processing apparatus. The apparatus includes circuitry that is configured to obtain order information for a plurality of previously fulfilled orders, each order of the plurality of previously fulfilled orders including at least one item, calculate based on the obtained order information, one or a combination of an affinity value of the item, and a popularity value of the item, the affinity value of the item being calculated with respect to at least one other item, and determine a plurality of available storage locations where the item can be stored, each available storage location corresponding to one of a plurality of storage racks and a position on a shelf of the one of the plurality of storage racks. The circuitry is also configured to calculate, for each available storage location, one or a combination of an affinity score of the storage rack corresponding to the respective available storage location with respect to the item, and a popularity score of the storage rack corresponding to the respective available storage location, select the storage location from the available storage locations based on at least one of the calculated affinity score of the storage rack corresponding to the selected storage location, and the calculated popularity score of the storage rack corresponding to the selected storage location, and instruct a vehicle to store the item at the selected storage location.

By one embodiment of the present disclosure is provided a non-transitory computer-readable medium storing instructions which when executed by a computer causes the computer to perform a method of selecting a storage location for an item. The method includes the steps of obtaining order information for a plurality of previously fulfilled orders, each order of the plurality of previously fulfilled orders including at least one item; calculating, based on the obtained order information, one or a combination of an affinity value of the item, and a popularity value of the item, the affinity value of the item being calculated with respect to at least one other item; determining a plurality of available storage locations where the item can be stored, each available storage location corresponding to one of a plurality of storage racks and a position on a shelf of the one of the plurality of storage racks; calculating, for each available storage location, one or a combination of an affinity score of the storage rack corresponding to the respective available storage location with respect to the item, and a popularity score of the storage rack corresponding to the respective available storage location; selecting the storage location from the available storage locations based on at least one of the calculated affinity score of the storage rack corresponding to the selected storage location, and the calculated popularity score of the storage rack corresponding to the selected storage location; and instructing a vehicle to store the item at the selected storage location.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of the present disclosure that are provided as examples will be described in detail with reference to the following figures, wherein like numerals reference like elements, and wherein.

DETAILED DESCRIPTION

Figure 1:
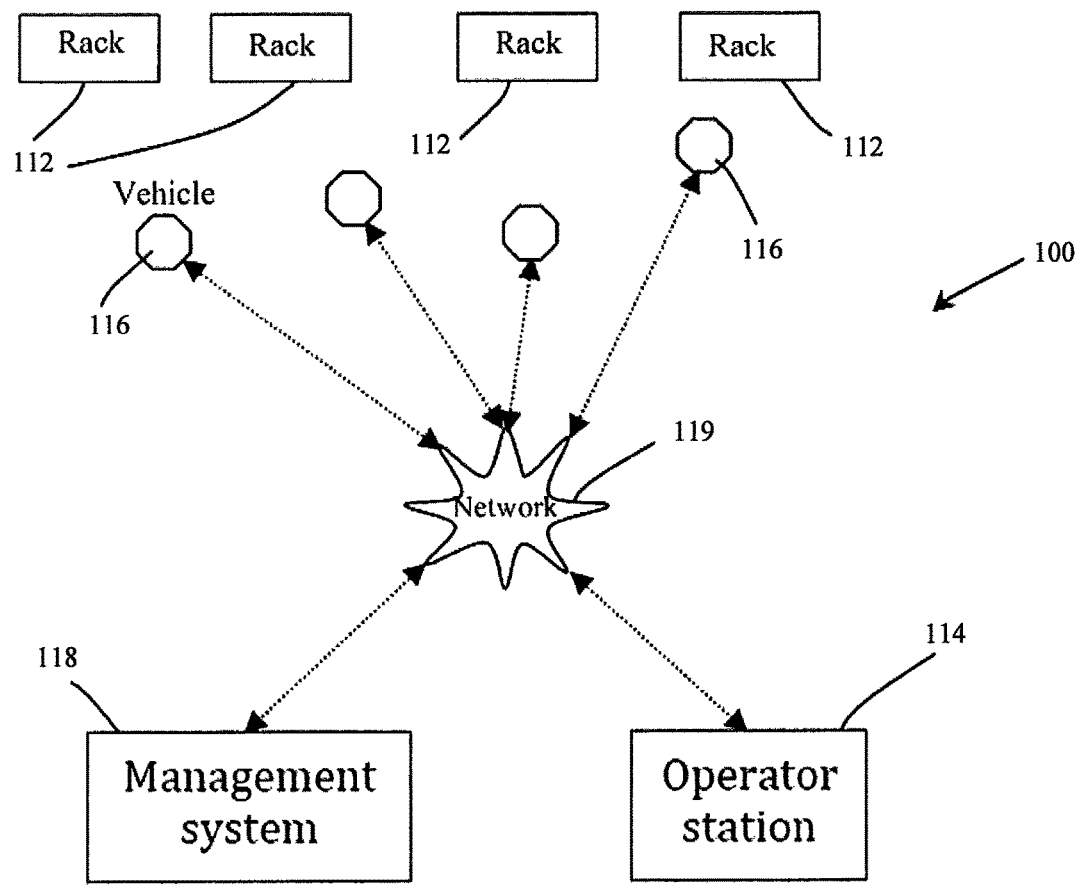
FIG. 1 is a block diagram of a warehouse system in accordance with an embodiment.
Figure 1:
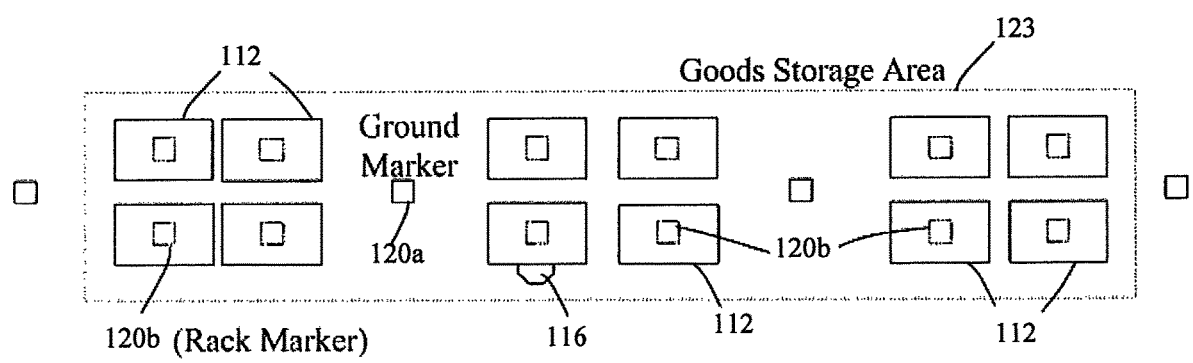

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

Turning to FIG. 1, there is provided a block diagram of a warehouse system 100 in accordance with an embodiment of the present disclosure. The warehouse system 100 includes a plurality of racks 112, each of which is configured to hold several products/items that may be included in an order, such as a customer order. The warehouse system 100 also includes one or more operator stations 114 and a plurality of vehicles 116 that transport racks 112 between a goods storage area 123 and one or more operator stations 114. In an example, the vehicles can be transportation vehicles or transportation robots, such as an automated guided vehicle.

Movement of the transportation vehicles 116 is managed by a management system 118, in communication with the operator station(s) 114 and the vehicles 116, through a communication network 119, such as a wireless communication network (e.g., WiFi, Bluetooth, ZigBee, etc.). By one embodiment, the management system 118 comprises an information processing apparatus such as a server (described later with reference to FIG. 9) that includes circuitry configured to control the navigational, monitoring, allocation of inventory to storage racks and the like.

In operation, products required to fulfill an order are transported between the goods storage area 123, and the operator station 114 by at least one vehicle 116. Orders are fulfilled in part, by transporting racks 112 including products of the order. The warehouse also includes markers 120a and 120b that are disposed, for instance, on the floor of the warehouse, and that enable navigating the vehicle 116 from one point to another. The inbound inventory process and outbound order fulfilment process are managed in this example by the management system 118. As described in the embodiments of the present disclosure, the management system 118 evaluates several criteria in determining an optimum storage location for products in the warehouse. In the remainder of the present disclosure, the terms 'product', 'item', and 'good' are used interchangeably to imply an individual article or unit that may be included in a order that is to be fulfilled by the warehouse system.

Figure 2:
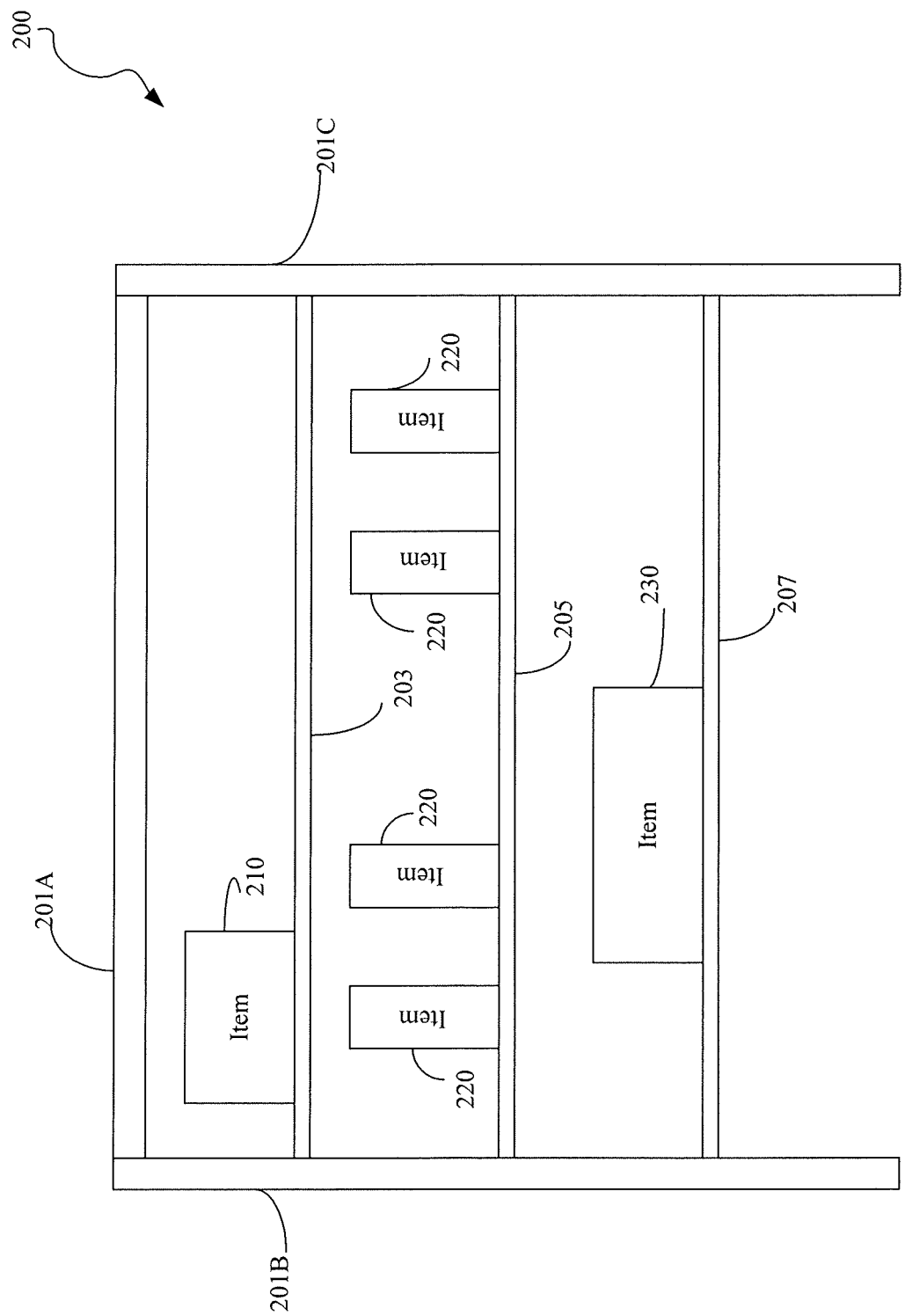
FIG. 2 is a diagrammatic representation illustrating a storage rack of the warehouse system.

FIG. 2 illustrates, according to an embodiment, a storage rack 200 of the warehouse system. The storage rack 200 includes a horizontal member (e.g., a metallic bar) 201A that is coupled at either ends to vertical members (metallic bars) 201B and 201C, respectively. The storage rack 200 includes several shelves 203, 205, and 207, each of which provide storage space to store products/items 210, 220, and 230, respectively. As described later with reference to FIG. 6, the items may be stored on the shelves of the storage racks in different configurations e.g., a vertical configuration such as item 220, or a horizontal configuration such as items 210 and 230, respectively.

According to one embodiment of the present disclosure, the storage rack 200 may include a partition that divides the storage rack into two portions: a front portion (as shown in FIG. 2), and a rear portion that is disposed directly behind the front portion. Accordingly, each shelf 203, 205, and 207 of the storage rack 200 includes a front portion storage area, and a rear portion storage area, respectively. Furthermore, a spacing between the shelves may be a fixed predetermined spacing (i.e., the shelves are affixed to the vertical bars 201B and 201C in a permanent fashion), or may be configurable by removably attaching either ends of the shelf into a specific pair of sockets that are disposed along the vertical bars 201B and 201C.

Figure 3:
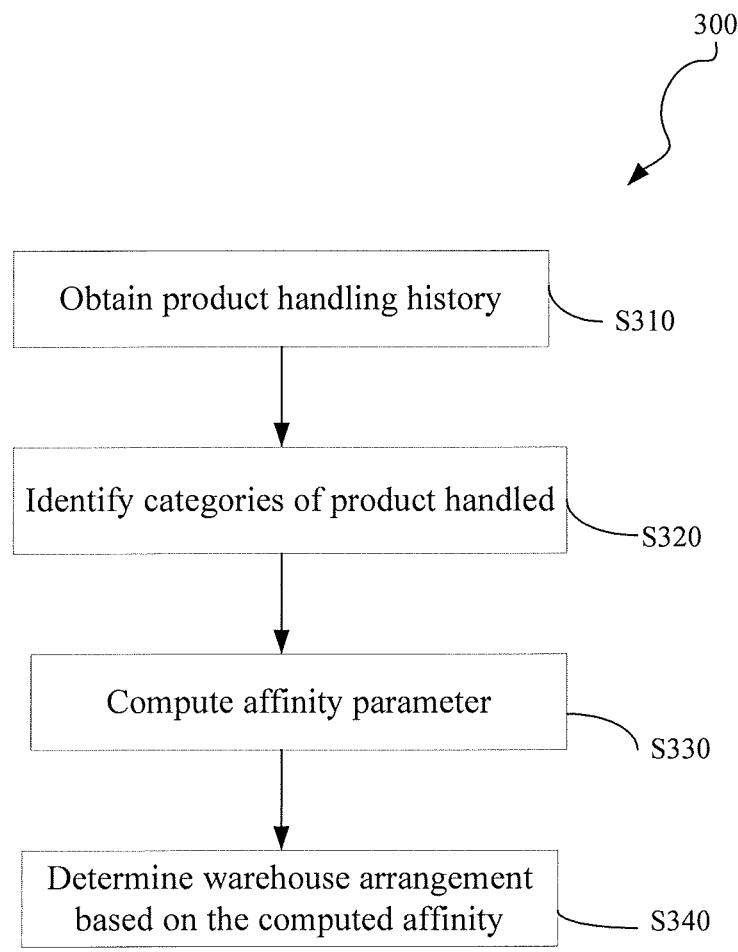
FIG. 3 depicts an exemplary flowchart illustrating a method of warehouse management.

Turning now to FIG. 3, there is illustrated a flowchart 300 depicting the steps performed by a management controller (i.e., a server of the warehouse system, and described later with reference to FIG. 9 and FIG. 10) in storing products in the racks of the warehouse system. Specifically, FIG. 3 depicts a technique of product management performed by the management controller according to an embodiment of the present disclosure. For the sake of clarity, the management controller is referred to herein after as a server.

The process as depicted in FIG. 3 commences in step S310, at which time previously processed orders in the warehouse are analyzed by the server.

In step S320, the server identifies categories of products based on the analyzed previous orders. For example, the categories may be classified as products which are more frequently ordered (e.g., popular products, products that are ordered together, products which are not ordered at all, products which have a low shelf life, etc).

The process further proceeds to step S330, wherein an affinity parameter (also referred to herein as an affinity value) is computed for each identified category of products. The affinity parameter for a particular pair of product is defined herein as a likelihood of the individual products belonging to the pair of product being ordered simultaneously. By one embodiment, the affinity parameter can take values in the range [0-1].

For instance, consider a set of five products {A, B, C, D, and E}. Assume that the previous ten orders processed by the server are: (A, B), (E), (A, C), (A, D), (A, B), (E), (A,C), (B,C), (A), and (A,B), respectively. It can be observed that within the last ten orders the product pair (A, B) was ordered three times. Further, the number of times either product A and/or product B was ordered was equal to eight. Accordingly, the affinity of the product pair (A, B) can be computed to be equal to ⅜. It must be appreciated that in the above stated example, product (E) is not ordered with another product. Accordingly, the affinity of product E with respect to each other product can be ascertained to be zero.

According to an embodiment of the present disclosure, for a set of N unique products in the warehouse, the server may be configured to compute the affinity parameters of each group of products, wherein a group is defined to include at least two products. Thus, the total number of groups can be computed as:

$$\sum_{k=2}^{n} \binom{n}{k}, \text{ wherein } \binom{n}{k} = \frac{n!}{(n-k)!k!}.$$

The server may be configured to compute an affinity parameter as described above for each of the groups.

By one embodiment, in order to reduce the computational complexity of the server, the server may be configured to compute the affinity parameter, only for groups including at most 'p' items in the group, wherein the parameter 'p' is substantially lower than N. Furthermore, it must be appreciated that the server is in no way restricted in computing the affinity parameters to have values restricted to the range [0 to 1]. Any other technique may be utilized to compute the affinity parameters. For instance, the server may assign positive affinity to a group of products that are frequently ordered together, and assign a negative affinity for a group of products that are seldomly ordered together. Note that from a perspective of storing and retrieving the products from the racks of the warehouse, it is beneficial to store the group of products that have high affinity values together (i.e., in close vicinity of each other), for example, on the same shelf of the rack, and store products with low affinity parameters apart/away from one another.

Upon computing the affinity parameters in step S330, the process proceeds to step S340, wherein an arrangement of warehouse is computed. By one embodiment, the arrangement can be realized as an n-dimensional data structure (e.g., an n-dimensional array) that maps all products with each other. If any group of product is to be fetched, then the counter at that particular location in the data structure is increased by one, wherein the counter represents the affinity quotient of that group.

By one embodiment, upon computing the affinity parameters for the various groups, a storage location can be evaluated for a particular product based on an affinity score of the storage rack (corresponding to the available storage location) with respect to the item. Specifically, when the server evaluates a location for storing a product, the server computes an affinity score for each potential storage location with respect to the item to be stored. The affinity score is computed as an average of the various affinity combinations that the new product will form with the existing products at the location.

For instance, assume that the affinity for the pair of products (A, B) is equal to 0.05, the affinity for the pair of product (A, C) is equal to 0.01, and the affinity for the pair of product (A, D) is equal to 0.07. Furthermore, assume that there are two potential locations, denoted as X and Y, where a newly arriving product A is to be stored. Assume that location X has items B and C already stored, and location Y has only item D stored. The server computes the affinity cost for choosing location X for product A as 0.03 (i.e., the average of affinity parameters (A, B) and (A,C), respectively), and the affinity cost for choosing location Y for product A as 0.07 (i.e., the affinity parameter for (A,D)). By one embodiment, the server may be configured to choose the location which results in the highest computed average affinity cost. Upon determining the storage locations for the products, the process in FIG. 3 terminates.

An aspect of the present disclosure provides for another technique to manage resources of the warehouse. Specifically, by one embodiment, in addition to the affinity parameter of the product groups, a popularity of a rack and/or product is computed in determining a storage location for a product. It must be appreciated that the popularity of the rack and/or product may also be used independent of the affinity parameter in other embodiments of the present disclosure.

Figure 4:
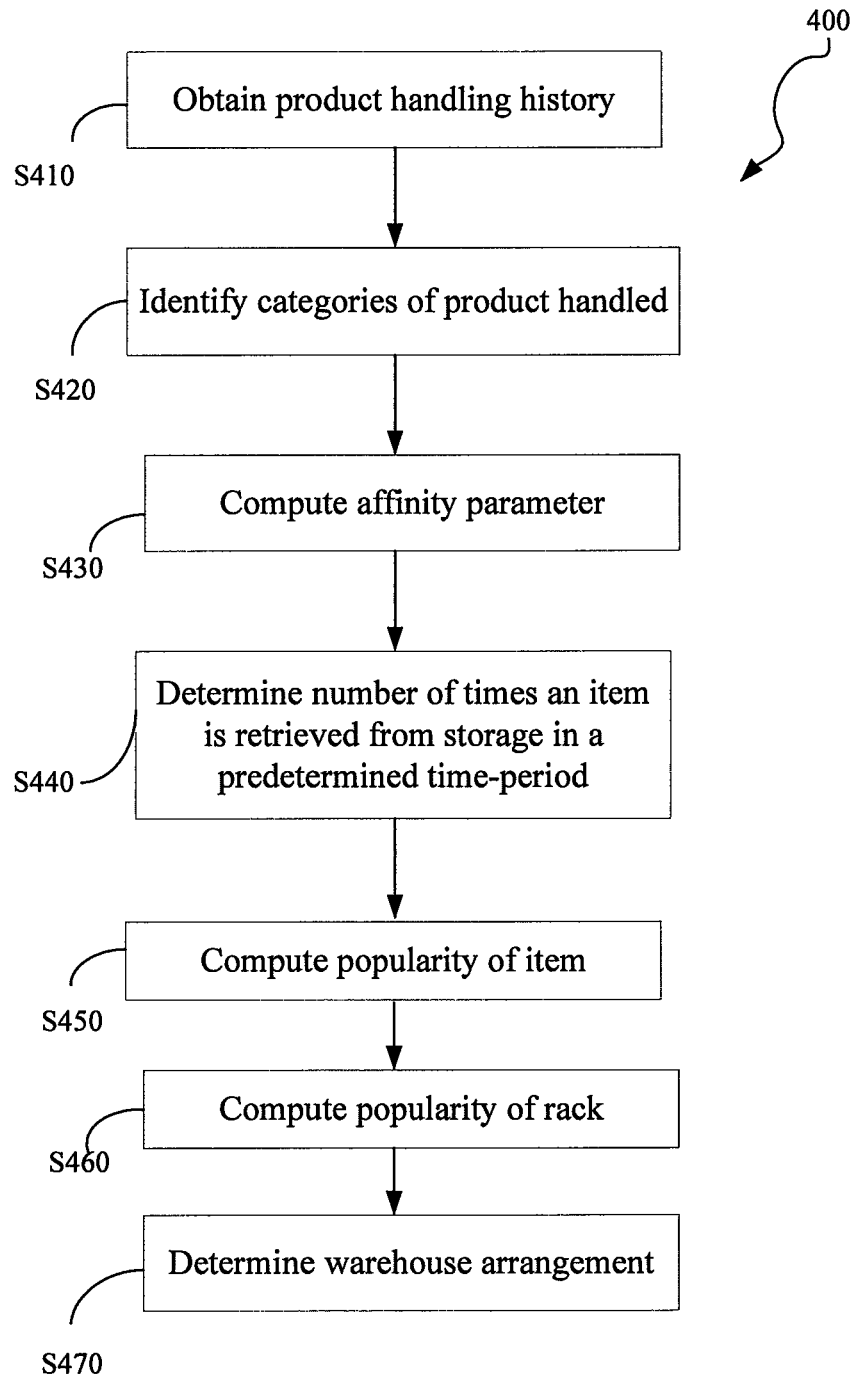
FIG. 4 depicts, according to another embodiment, an exemplary flowchart illustrating a method of warehouse management.

FIG. 4 depicts, according to an embodiment, a flowchart 400 illustrating steps performed by the server in determining a storage location for a product. The steps S410-S430 are similar to the steps S310-S330 as depicted in FIG. 3. Accordingly, a description of these steps is not repeated herein for sake of repetition.

The process in step S440 determines a number of times a particular product is retrieved from the storage racks over a predetermined amount of time. For instance, the server may consider a predetermined number of previous orders and/or set a fixed time-duration (e.g., two months) to compute the number of times a particular product was retrieved.

In step S450, the server computes a popularity of the product based on the number of times the product was retrieved. For instance, the server may compute the popularity of the product, as a ratio of the number of times the product was retrieved, and a total number of times a retrieval operation was performed to obtain any item.

Further, in step S460, by one embodiment of the present disclosure, the server computes a popularity score of a rack. The popularity score of the rack can be computed based on the computed popularities of the products currently stored on the rack. For instance, the popularity score of the rack can be computed as a sum of the popularity of products in the rack, or the number of times the rack is retrieved or moved to an operator station.

The process further proceeds to step S470, at which time incoming products (e.g., products included in a newly received inventory) are stored on the racks based on the computed popularities of the products and the popularity scores of the racks. By one embodiment, a product to be stored on the racks of the warehouse is assigned a rack that has a highest popularity score. Additionally, the popularity score of the rack, the popularity of the product, and the affinity parameter of the product may be taken into consideration for identifying a storage space for the product. By one embodiment, and as described later with reference to FIG. 7, the product is stored on a rack whose popularity score is similar to the popularity of the product. Upon determining the storage space for the product the process in FIG. 4 terminates.

Figure 5:
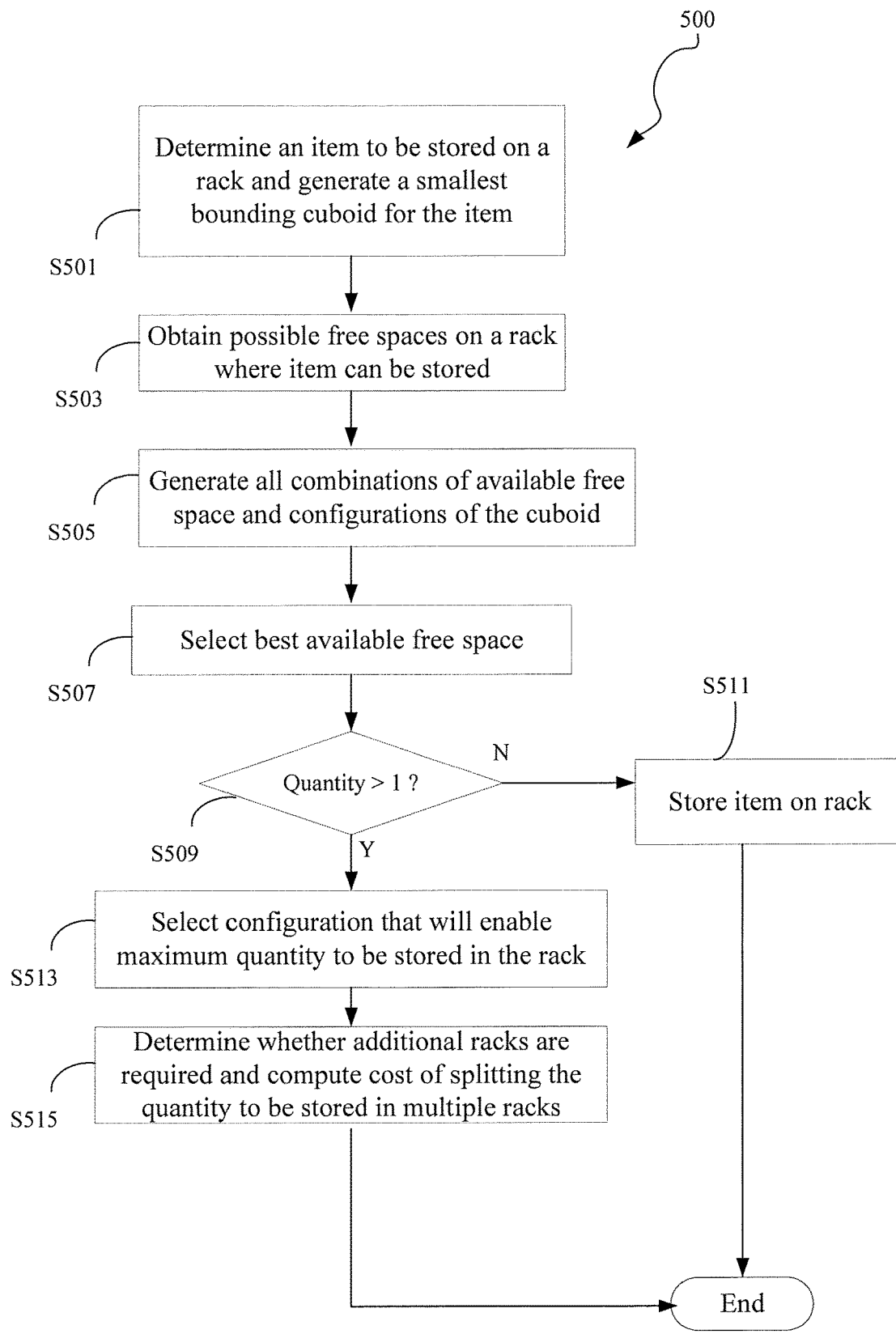
FIG. 5 depicts, according to one embodiment, a flowchart illustrating a method of warehouse management.

FIG. 5 depicts a flowchart 500 illustrating a method of warehouse management according to one embodiment. Specifically, FIG. 5 illustrates a method of warehouse management with reference to identification of a location within a storage rack where a product or item is to be stored.

The process commences in step S501, at which time the current item to be stored on the rack is determined, and a smallest bounding cuboid (i.e., a convex polyhedron bounded by six quadrilateral faces that completely encapsulates the item) is generated. The cuboid may be generated based on pre-stored information regarding the dimensions of the product, an operator input of the dimension information, and the like.

Further, in step S503, all free spaces (e.g., currently available storage spaces in the racks) are determined. As described later with reference to FIG. 9, the management controller (server) of the warehouse maintains information regarding all the racks, such as rack size, available rack space, items stored on the racks, and the like. Note that all previously stored items on the racks are taken into account while determining storage locations for the current item.

Figure 6:
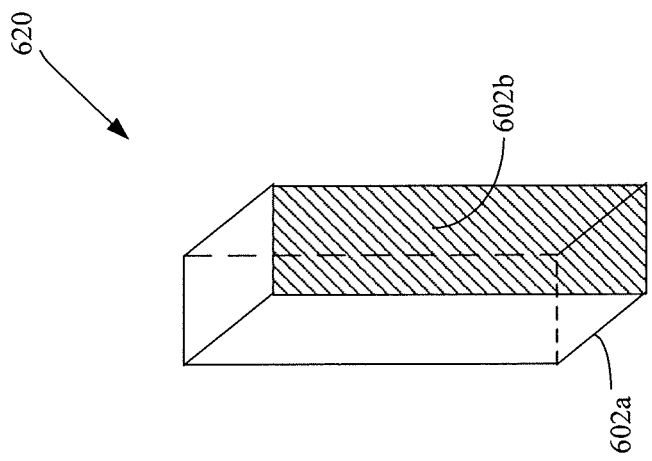
FIG. 6 depicts, according to an embodiment, exemplary orientations of a cuboid.
Figure 6:
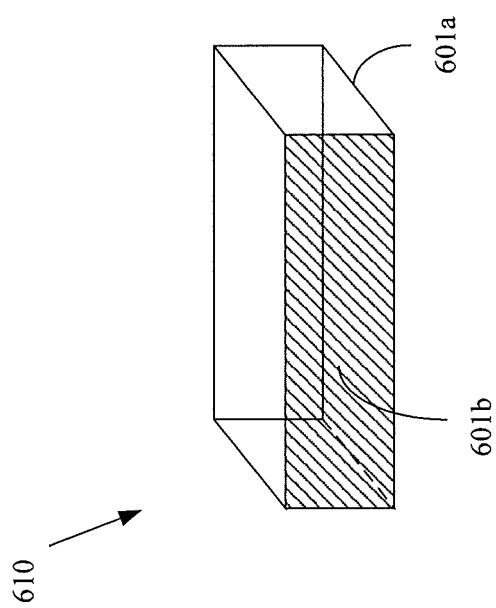

The process further proceeds to step S505, at which time all combinations of available free spaces on the racks, and configurations of the smallest bounding cuboids are generated. The configurations of the smallest bounding cuboid correspond to orientations of the cuboid. For instance, according to one embodiment, FIG. 6 depicts an exemplary horizontal orientation 610, and a vertical orientation 620 of a cuboid. The orientation 610 corresponds to the cuboid being placed on its bottom surface 601a on the shelf of a rack. In such an orientation, a longitudinal surface of the cuboid 601b (depicted as a shaded surface in FIG. 6) corresponds to an outward facing surface of the item, when the item is stored on the rack. In a similar manner, the configuration 620 corresponds to a vertical orientation of the cuboid, where the longitudinal surface 602b (shaded surface) is positioned vertically on the shelf, i.e., in a direction along the height of the storage rack. In such a configuration, the surface 602a is in contact with the surface of the shelf.

By one embodiment, the configurations of the cuboid may be selected based on a set of predetermined parameters such as a manufacturer's preference for orientation and stability of orientation. Upon determining the number of available free spaces on the racks, and the orientations of the cuboid, all the free spaces are assessed to determine whether a particular free space can accommodate a particular orientation. The free space-cuboid orientations that cannot be accommodated are rejected. Additionally, a free space-cuboid orientation combination may also be rejected if the orientation of the cuboid positioned in the free space, will increase the center of gravity of the rack above a predetermined threshold. The predetermined threshold for the center of gravity of the rack (including items disposed thereon) may be set based on a safe operating condition of the rack.

Furthermore, by one embodiment, each shelf of the rack may have a maximum weight limit that corresponds to the amount of weight allowed to be placed on the rack shelf. If a free space on a particular shelf of the rack may accommodate the desired cuboid orientation, but may however violate the weight limit, such a free space-cuboid orientation will be rejected.

According to one embodiment, each shelf of the rack is assigned a predetermined density profile. Specifically, each shelf of the rack is assigned a unique density range. The placement of items on the shelfs of the racks is performed in a manner such that a density of the item that is to be placed in the rack, lies in the density range allocated for the shelf of the rack where the item is placed.

Upon determining a set of available free space-cuboid combination, the process in step S507 selects a best available free space to store the item. By one embodiment, the best free space may be selected based on a number of criteria such as, an amount of time required to retrieve the rack to a particular processing station, a distance of the rack from the processing station, a difference in popularity score of the rack and popularity of the item, an affinity of the item with respect to one or more other items on the rack, a shelf of the rack where the item is to placed (as it may be desired to store heavier items on a lower shelf of the rack such that it is easily retrievable), an amount of space left in the rack to accommodate subsequent items, and the like.

The process then proceeds to step S509, where a query is made to determine whether a quantity of the item that is placed in a rack shelf in step S507 is greater than one. If the response to the query is negative, the process moves to step S511, where the item is allocated the selected storage space, whereafter the process terminates.

However, if the response to the query in step S509 is affirmative, the process moves to step S513, where from the set of possible configurations of the cuboid associated with the item, the storage configuration which results in allocation of free space for a maximum number items (of the quantity of determined items) is selected.

Further, the process moves to step S515, wherein the server computes a number of left over items (i.e., items which were not allocated a storage space). For the leftover items the server may repeat the processing performed in step S513, in order to determine an available storage location for the leftover items. By one embodiment of the present disclosure, the server may compute a cost of splitting the items (i.e., storing the quantity of items in several racks). For instance, the cost of splitting the items may be computed based on an amount of time required to retrieve the items from the various racks and/or affinity of items on different racks. Upon allocating the storage locations for the quantity of items, the process as depicted in FIG. 5 terminates.

By one embodiment of the present disclosure, each item may be assigned a storage space on a particular rack, based on the computed popularity of the item. As stated previously with reference to FIG. 4, a particular item having a certain computed popularity may be assigned to a rack having a substantially similar popularity score. The motivation in assigning a popular item to a popular rack is that, when the popular rack is retrieved for servicing an incoming order, there is a high probability that the rack will be used for servicing other orders, as the rack includes popular items. Thus, it is anticipated that a lower number of other racks will be retrieved to service the incoming orders, and that the total distance traveled by the rack will decrease (e.g., when the distance between operator stations(s) servicing the different orders is smaller than the distance between the operator station(s) and the rack storage locations). In doing so, the warehouse management system incurs the advantageous ability of lowering operational costs of the warehouse.

Moreover, as stated previously with reference to FIG. 2, each rack may include a partition that divides the rack into a front portion (or a front side) and a rear portion (or a back side). Thus, each of the shelves included in the rack have a front storage area and a rear storage area, respectively. In what follows is described a technique of computing a popularity weight for each portion (i.e., side) of the rack. Upon computing the popularity weight of each portion of the rack, by one embodiment, an incoming item may be assigned to a portion of a particular rack, such that the popularity weight of the portion of the rack is substantially similar to the popularity of the item.

According to one embodiment of the present disclosure, upon determining the storage location for a particular product, the server may initiate a task to the vehicles in the warehouse. For example, the server may transmit a signal to the vehicle, notifying the vehicle of a storage allocation of the particular product. Further, the server may instruct the vehicle to retrieve the selected storage rack and deliver the storage rack at a predetermined processing station. Alternatively, the server may also instruct the vehicle to retrieve the product from a station, and store the product at a desired storage location within the identified storage rack.

Figure 7:
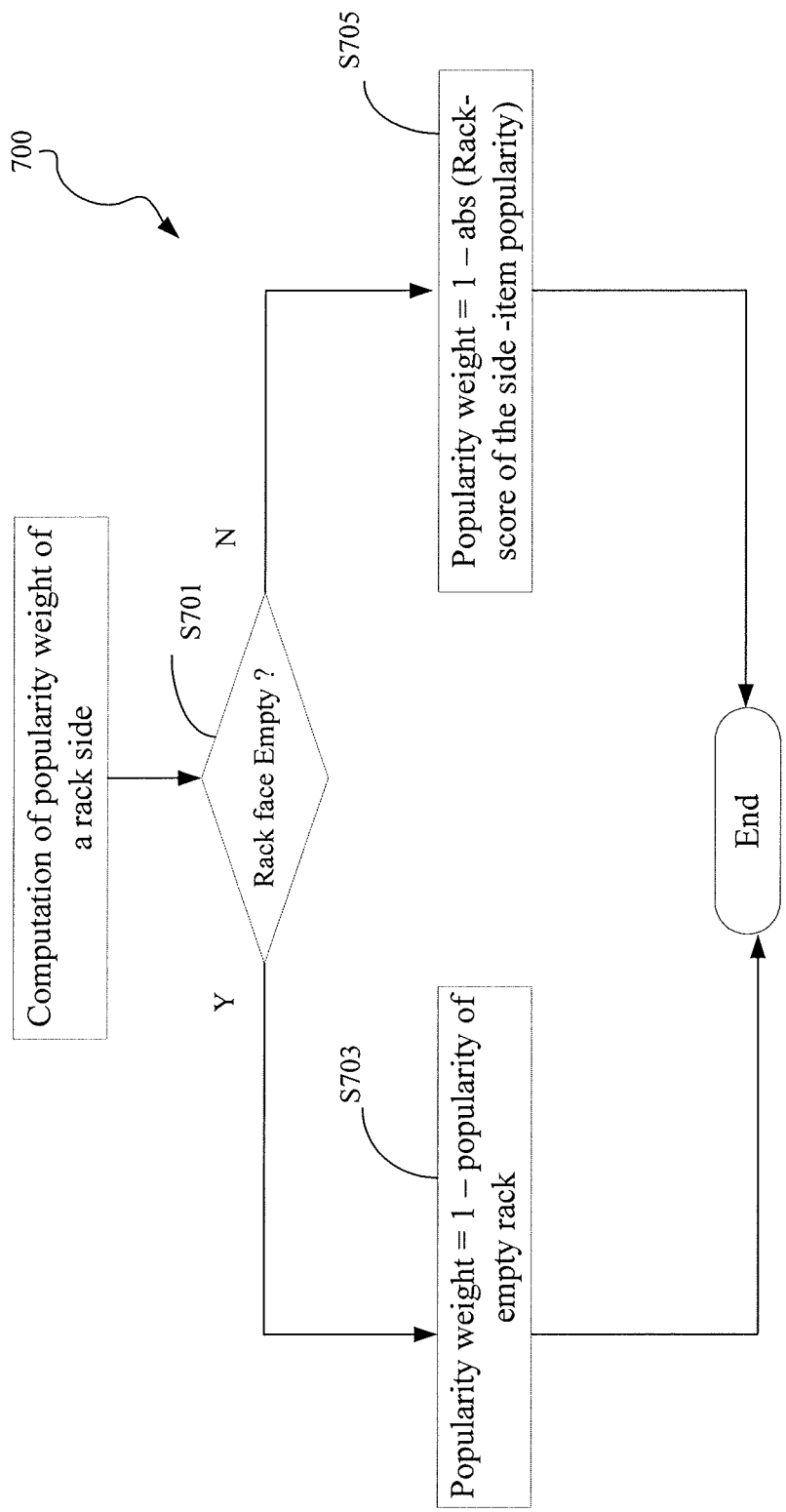
FIG. 7 depicts a flowchart illustrating the steps performed in computing a popularity weight of a storage rack.

FIG. 7 depicts a flowchart 700 illustrating, according to an embodiment, a method of warehouse management. Specifically, FIG. 7 depicts the steps of computing the popularity weight (also referred to as popularity score) of the portions of the rack.

The process commences in step S701, wherein a query is made to determine whether a portion (i.e., a side or a face) of the rack is empty. If the response to the query is affirmative, the process proceeds to step S703. If the response to the query is negative, the process proceeds to step S705.

In step S703, upon determining that the face of the rack is empty, the popularity weight is assigned to the face as follows:

$$\text{popularity weight}=1-\text{popularity of empty rack}, \quad (1)$$

where popularity of an empty rack is set to a predetermined number such as 0.1. Note that the popularity of an empty rack is assigned a predetermined number that is slightly greater than zero. The value of zero is not assigned as a popularity of the rack, because in doing so, the rack may not be selected to put any items. Rather, by one embodiment, the popularity weight is set to a high value, so that is there are no racks available (that have a popularity score, which is substantially similar to the product's popularity), then the product is assigned to the new rack.

In step S705, upon determining that the face of the rack is not empty, the popularity weight of the face of the rack is computed as follows:

$$\text{popularity weight}=1-\text{abs}(RS-IP) \quad (2)$$

where the function abs( ) corresponds to an absolute value function, which computes an absolute value of its parameters, RS corresponds to a rack-score of a face of the rack, and IP corresponds to the item popularity. The rack score (RS) for a given face (portion) of a rack is computed as follows:

$$RS = \frac{\Sigma_{all\ items}(\text{quantity of the item in the rack face}) * (\text{popularity of the item})}{(\text{total number of items in the rack face})} \quad (3)$$

In this manner, by one embodiment of the present disclosure, an item having a certain computed popularity is assigned to a portion of a rack space having a substantially similar popularity score (i.e., popularity weight). Upon computing the popularity weights of the portions of the racks as depicted in equations (1) to (3) above, the process as depicted in FIG. 7 terminates. It must be appreciated that the embodiments described herein are in no way limited to computing the rack-score based only on a mean of the popularity of the items stored on the rack. Rather, any statistical measure such as a weighted mean, weighted median and the like may be utilized in computing the rack-score.

Figure 8:
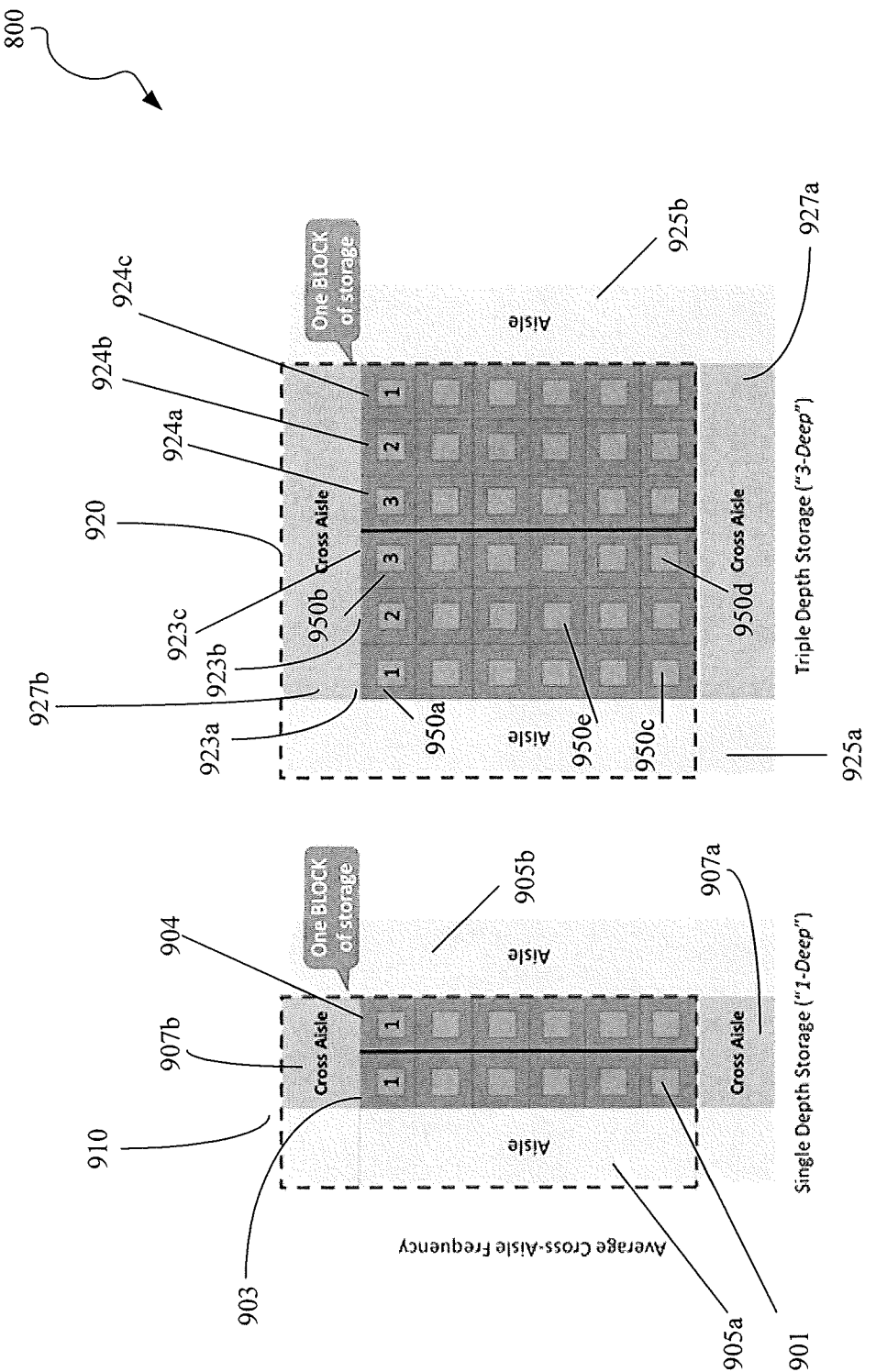
FIG. 8 depicts, according to an embodiment, exemplary N-deep configurations of storage racks.

FIG. 8 depicts an exemplary configuration of storage racks 800 according to an embodiment of the present disclosure. The configuration of storage racks in the warehouse is referred to herein as 'N-deep' storage, where N corresponds to a number of columns of storage racks that are positioned back-to-back without including an aisle (i.e., a path for vehicles and/or humans to traverse) between them. The N-deep storage configuration includes a first portion of storage racks, and a second portion of storage racks. Each of the first portion and the second portion of the storage racks includes N columns of storage racks positioned in a back-to-back fashion. Moreover, a column of storage rack included in the first portion is positioned adjacent to one of the columns of the second portion, such that there is no aisle between the first portion and the second portion.

For instance, referring to FIG. 8, the storage configuration 910 depicts a 1-deep storage configuration. The configuration 910 comprises a first portion, which includes N=1 column 903 of storage racks 901, and a second portion, which also includes N=1 column 904 of storage racks. Note that the storage racks of the first portion and the second portion are positioned in a manner such that there is no aisle between the first portion and the second portion. Furthermore, each of the first and second portions of storage of the 1-deep storage configuration includes a predetermined number of storage racks (e.g., six storage racks), in each column.

As depicted in FIG. 8, the 1-deep storage configuration includes a pair of aisles 905a and 905b, which are disposed to the left and to the right of the first portion and the second portion of storage racks, respectively. Additionally, a pair of cross-aisles 907a and 907b is disposed to the top and to the bottom of the first portion and second portion of the storage racks. As shown in FIG. 8, the first portion 903, the second portion 904, the cross aisle 907b and the aisle 905a form a single unit of storage of the 1-deep configuration.

In a similar manner, FIG. 8 depicts a storage configuration 920 corresponding to a 3-deep storage configuration. The configuration 920 comprises a first portion and a second portion of storage racks. The first portion includes N=3 columns of storage racks denoted as 923a, 923b, and 923c, respectively, and the second portion includes N=3 columns of storage racks 924a, 924b, and 924c, respectively. Note that the storage racks of the first portion and the second portion are positioned in a manner such that there is no aisle between the first portion and the second portion. Specifically, there is no aisle between the storage column 923c of the first portion, and storage column 924a of the second portion. Furthermore, each of the first portion and the second portion of storage of the 3-deep storage configuration includes a predetermined number of storage racks (e.g., six storage racks), in each column.

Moreover, the 3-deep configuration includes a pair of aisles 925a and 925b, which are disposed to the left and to the right of the first portion and the second portion of storage racks, respectively. Additionally, a pair of cross-aisles 927a and 927b is disposed to the top and to the bottom of the first portion and second portion of the storage racks of the 3-deep configuration.

Referring to the configuration 920 in FIG. 8, each column of the storage rack of the first portion has an associated depth parameter. The depth parameter (d) of a storage rack corresponds to a column ID in which the storage rack is located. The column ID of a particular column corresponds to a number of columns that the particular column is disposed away from the aisle that is associated with the portion of the storage racks in which the column is included. For instance, the storage rack 950e has a depth of d=2, as it is located in the second column of the first portion of the storage racks. Similarly, storage racks 950a and 950c have a depth of d=1, whereas storage rack 950b and 950d have a depth of d=3. By one embodiment, the column IDs for the storage columns may be assigned integer values in a sequentially increasing manner such that the column located closest to the aisle is assigned the smallest integer, and the column located farthest from the aisle is assigned the highest integer.

In a similar manner, each storage column included in the second portion of the storage block has an associated depth parameter. By one embodiment, the storage racks may be retrievable only from the aisle associated with the portion of the storage block. For instance, the storage racks 950a-950e may be retrieved only from aisle 925a. In such a scenario, the storage racks in column 923a require less time to be retrieved, whereas the storage racks in column 923c require a longer time for retrieval. Alternatively, by one embodiment, the storage racks may be retrievable from both the aisle as well as the cross aisles.

By one embodiment of the present disclosure, the number of columns included in each portion of the storage block is dependent on the type of warehouse. For instance, a warehouse may be one of a throughput based warehouse and a storage based warehouse. A primary factor governing the operation of a throughput based warehouse (e.g., an e-commerce warehouse) is the amount of time required to retrieve a storage rack from the N-deep storage configuration. Accordingly, for such a warehouse, the number of columns in each portion of the N-deep storage is kept low. For example, in a throughput based warehouse, the maximum depth of each portion may be maintained at a depth of d=2 or 3.

In contrast, a storage based warehouse (e.g. a B2B oriented warehouse) typically deals with fewer types of unique items, but includes large quantities of each type of item. The storage type of warehouse generally enforces relaxed time constraints on the amount of time required to retrieve a storage rack. The emphasis in a storage type of warehouse is given to the amount of items that can be packed in an efficient manner. Accordingly a N-deep storage configuration with a higher value of d (e.g., d>5) may be assigned for the storage blocks in a storage based warehouse.

According to one embodiment, the affinity of the items and/or the popularity of the items may be used to determine a storage rack within the N-deep storage configuration that is to be allocated for the storage of the item. For example, an item having a high popularity parameter is stored in a storage rack that is disposed on the periphery of the storage configuration. Accordingly, retrieval of such a storage rack is convenient. In a similar manner, items that are less popular are stored in a deeper column of storage (i.e., a column having a high value of depth), as less popular items are less frequently retrieved from the storage racks.

By one embodiment, different configurations of N-deep (i.e., different values of N) may be assigned to different storage blocks in the warehouse. For instance, the set of products (items) in the warehouse may be sorted based on popularity. A first predetermined number of popular items may be stored in storage blocks having a low value of N. Conversely, items which are less popular may be stored in storage blocks having a large value of N. Moreover, storage blocks having a low value of N may be assigned a warehouse space that is more frequently traversed. For instance, consider a combination of three 1-deep storage configurations positioned adjacent to one another. Such a combination will provide a total of four aisles for vehicle traversal. Thus, such a configuration may be assigned to an area of the warehouse which is frequently traversed by vehicles and/or humans. In contrast, items which are less popular may be stored in a storage block having a high value of N. Such storage blocks may be allocated space towards the periphery of the warehouse, as such areas may be less frequently traversed.

By one embodiment, the configuration of a particular storage block may be changed in a dynamic manner over a period of time. For instance, consider an item (item A) stored in a storage rack of an N-deep storage configuration having a high value of N. The item may be initially stored in such a storage configuration as it may have a low popularity. However, over a period of time, as new orders are received in the warehouse, the management controller may determine that a substantially high number of orders request item A. Accordingly, the management controller may determine to reduce the value of N corresponding to the storage block where item A is stored. By one embodiment, the storage racks included in the storage column of the N-deep configuration may be disposed on wheels, thus enabling easy movement of the storage blocks for purposes of reconfiguring the storage configuration.

By one aspect of the present disclosure, a given warehouse may be categorized as a storage-based warehouse, or a throughput-based warehouse. However, it must be appreciated that the categorization of the warehouse may not remain static, but may change over a period of time. For example, the categorization may change depending on the time of the year, and the like. Specifically, the warehouse may transition from being a throughput-based warehouse to a storage based warehouse (and vice-versa). Accordingly, the storage configuration (i.e., number of racks included in the first and second portions of the n-deep storage configuration) may be reconfigured based on a change in the categorization of the warehouse.

According to one embodiment of the present disclosure, the first portion and the second portion of the n-deep storage configuration may include a unique number of storage columns. For instance, the first portion may include 'n' number of columns positioned in a back-to-back manner, and the second portion may include 'm' (where 0<m<n) number of columns. Furthermore, note that by one embodiment, access to storage racks of each portion of the n-deep storage configuration may be limited only from the associated aisle with the portion of the storage. However, based on the type of the warehouse, access to the storage racks may also be granted from the cross-aisles associated with the portions of the storage configuration.

Figure 9:
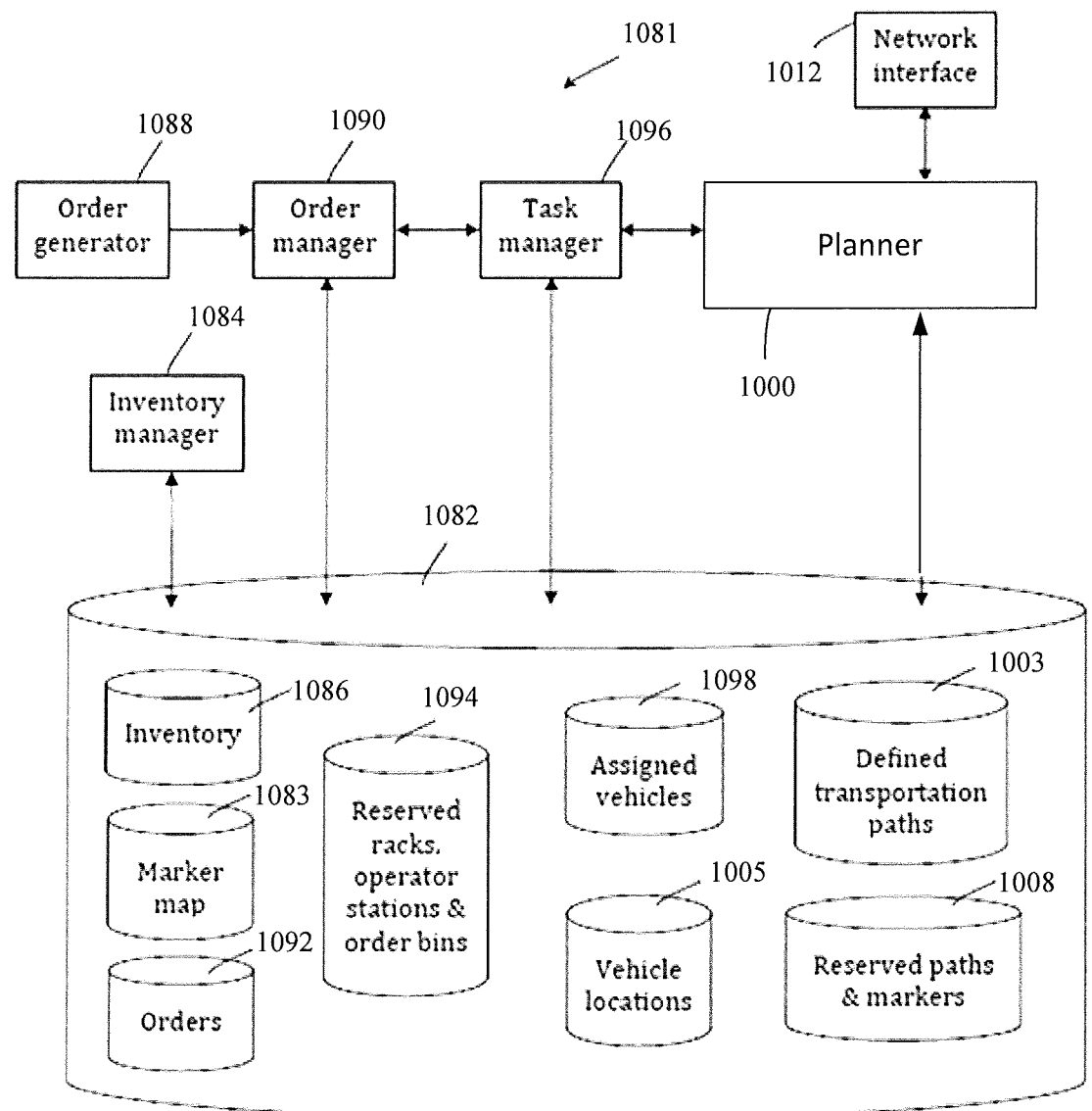
FIG. 9 is a block diagram illustrating functional components of a management system of the warehouse.
Figure 10:
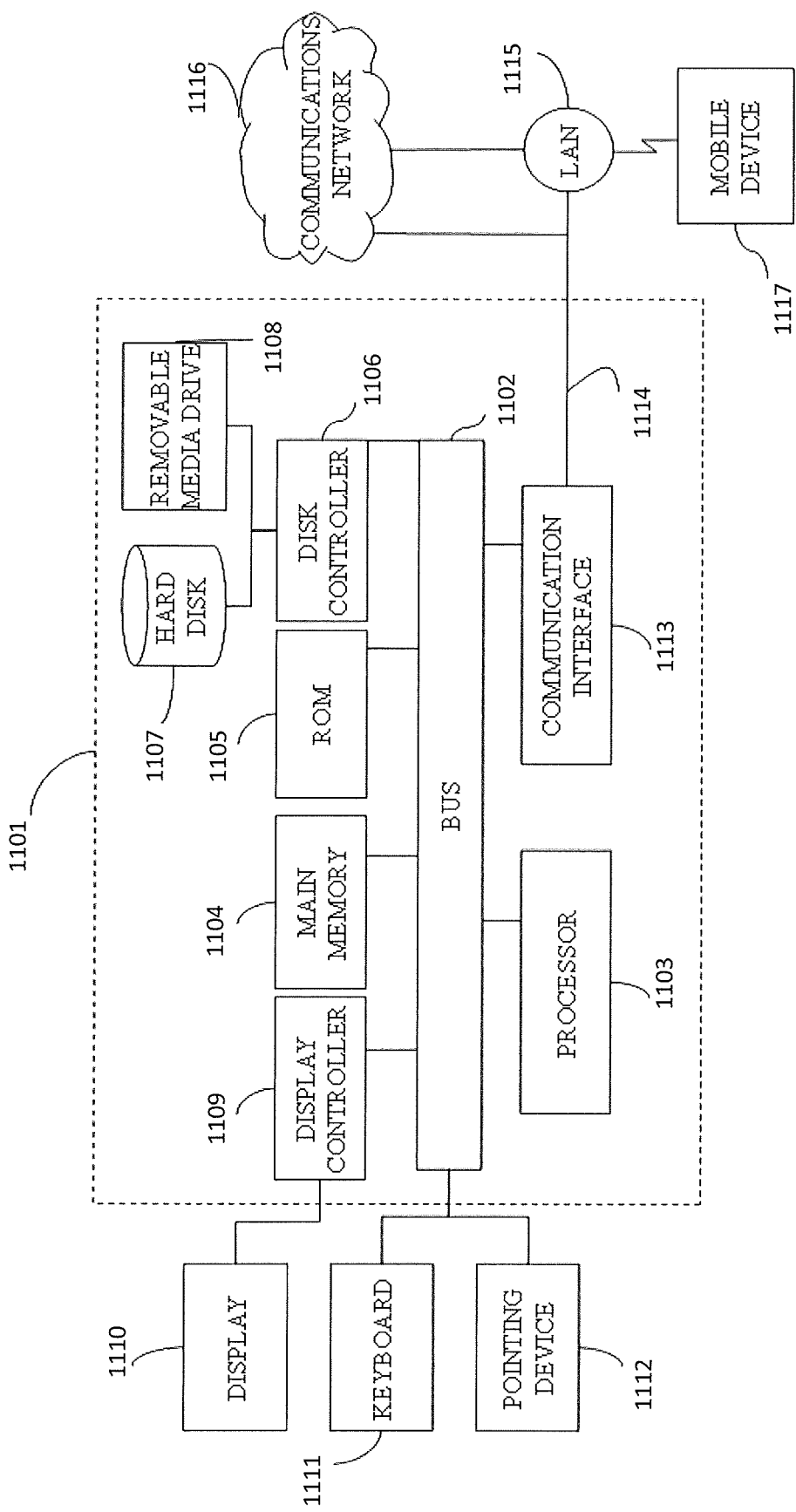
FIG. 10 illustrates a block diagram of a computing device according to one embodiment.

FIG. 9 depicts a block diagram illustrating functional components of a management server of the warehouse. According to one embodiment, the management system includes a controller configured to perform the functions recited herein.

The functional components 1081 are implemented by circuitry and use any suitable arrangement, for example a suitable computing device with associated processor(s), memory, and data storage (described later with reference to FIG. 10). In an embodiment, the functional components 1081 include one (or more) servers working in conjunction with one or more databases. It must be appreciated that the servers described herein are not limited to any specific combination or hardware circuitry and/or software.

The functional components 1081 include a data storage device 1082, such as a hard disc drive (HDD) or a solid state device (SSD), represented in FIG. 9 as a database, although it will be understood that any suitable data storage arrangement is contemplated by embodiments described herein. The data storage device 1082 is arranged to store marker data 1083 indicative of a marker map that includes unique identifying information associated with each marker 120a and the navigational relationships with other markers.

The functional components 1081 also include an inventory manager 1084 that manages the process of adding new products to the warehouse, and records the current inventory of items in an inventory database 1086. The inventory database 1086 also includes information indicative of the respective storage locations of the racks 112 in the warehouse and of the locations of the items on the racks 112. In this way, the storage locations of all items in the warehouse are known. Furthermore, information pertaining to items such as affinity of the item, size, weight, shape, smallest bounding cuboid of the item, and the like can be stored in the inventory database 1086.

An order generator 1088 manages receipt of orders from customers, such as orders received through an on-line checkout system associated with an electronic commerce website. Created orders are managed by an order manager 1090 that stores details of the created orders as order entries in a pending orders database 1092. The order manager 1090 handles the orders posted by a client, such as posted orders through a network interface 1012. The network interface 1012 formats the incoming order to process them and posts them to the system using one or more order application programming interfaces (APIs). The orders are posted to the pending orders list. The order manager 1090 also manages the timing fulfilment of the pending orders in the orders database 1092. For example, the order manager 1090 is configured to initiate the processing of a pending order when a trigger signal is generated to indicate that an order bin at an operator station 114 is available to fulfill an order.

Additionally, the functional components of block diagram 1081 also include a task manager 1096 that selects at least one vehicle 116 for the fulfilment of an order, when the order is selected for processing. The vehicles 116 are selected based on availability, task priority, and a cost of the task. The available vehicles 116 are identified and within the identified available vehicles 116, a set of vehicles are selected based on vehicles 116 currently free or in a pause state and proximity of the vehicles 116 to the racks 112 in the selected rack combination for the order. Each selected vehicle 116 is assigned a task to retrieve a particular rack 112 from the goods storage area 123. The vehicle(s) 116 selected for the order are stored in an assigned vehicles database 1098. Moreover information pertaining to the storage racks such as dimensions, available storage space, the assigned location for the storage rack in the warehouse, and the like are stored in database 1094.

The functional components of the block diagram 1081 also include a planner 1000 that controls and coordinates the planning and reservation of navigation paths for the selected vehicles 116 within a vehicle map structure. The planner 1000 also plans for implementation of the movements of the vehicles 116 to and from the selected operator station 114, including control over vehicle start/stop actions and vehicle pausing/unpausing actions. The planner 1000 also manages charging of the vehicles 116, including checking the charge state of the vehicles 116 and movement of the vehicles 116 requiring charging to a vehicle charging station. The planner 1000 plans the execution of an assigned task, which includes but is not limited to, waiting for the vehicle 116 to achieve a ready state, changing the reservation status and updating the status of the task, checking the charge level of the vehicles 116, and assigning tasks to be charged. Managing the flow of vehicles 116 into and out of a charging station is also controlled by the planner 1000. Moreover the planner 1000 may maintain a list of current vehicle locations in a vehicle database 1005.

The planner 1000 may include a path calculator that calculates transportation paths for each of the vehicles 116 in the set of vehicles selected for fulfilment of an order. Each transportation path defines a sequence of markers that a vehicle 116 will follow in order to transport a rack 112 to a rack storage location in the goods storage area 123 and between the rack storage location and the operator station 114. Calculated transportation paths for each vehicle 116 are stored in a defined paths database 1003. By one embodiment, the 'cost' of each defined transportation path is based on the time taken to travel from an initial source to a final destination.

Additionally, the planner 1000 may also include a reservation manager that manages reservations of markers and navigation paths between markers to avoid collisions between vehicles 116. The planner 1000 stores information indicative of the reserved markers and navigation paths in a reserved paths and markers database 1008. As shown in FIG. 9, the functional components of the block diagram 1081 of the management system may include a network interface 1012 that facilitates networked communications between the management system 118, the vehicles 116, and the operator stations 114.

Each of the functions of the described embodiments may be implemented by one or more processing circuits. A processing circuit includes a programmed processor (for example, processor 1103 in FIG. 10), as a processor includes circuitry. A processing circuit also includes devices such as an application-specific integrated circuit (ASIC) and circuit components that are arranged to perform the recited functions.

The various features discussed above may be implemented by a computer system (or programmable logic). FIG. 10 illustrates such a computer system 1101. In one embodiment, the computer system 1101 is a particular, special-purpose machine when the processor 1103 is programmed to perform navigational processes of the vehicle, computing compensation path, and other functions described above.

The computer system 1101 includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the computer system 1101 using an appropriate device interface (e.g., small computer system interface (SCSI), integrated device electronics (IDE), enhanced-IDE (E-IDE), direct memory access (DMA), or ultra-DMA).

The computer system 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1101 may also include a display controller 1109 coupled to the bus 1102 to control a display 1110, for displaying information to a computer user. The computer system includes input devices, such as a keyboard 1111 and a pointing device 1112, for interacting with a computer user and providing information to the processor 1103. The pointing device 1112, for example, may be a mouse, a trackball, a finger for a touch screen sensor, or a pointing stick for communicating direction information and command selections to the processor 1103 and for controlling cursor movement on the display 1110.

The processor 1103 executes one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the computer system 1101 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, ROM 1105, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1101, for driving a device or devices for implementing the features of the present disclosure, and for enabling the computer system 1101 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present dislcosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1103 for execution. A computer readable medium may take many forms, including but not limited to, non-volatile media or volatile media. Non-volatile media includes, for example, optical, magnetic disks, and magneto-optical disks, such as the hard disk 1107 or the removable media drive 1108. Volatile media includes dynamic memory, such as the main memory 1104. Transmission media, on the contrary, includes coaxial cables, copper wire and fiber optics, including the wires that make up the bus 1102. Transmission media also may also take the form of acoustic or light waves, such as those generated during radio wave and infrared data communications.

Various forms of computer readable media may be involved in carrying out one or more sequences of one or more instructions to processor 1103 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1101 may receive the data on the telephone line and place the data on the bus 1102. The bus 1102 carries the data to the main memory 1104, from which the processor 1103 retrieves and executes the instructions. The instructions received by the main memory 1104 may optionally be stored on storage device 1107 or 1108 either before or after execution by processor 1103.

The computer system 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a network interface card to attach to any packet switched LAN. As another example, the communication interface 1113 may be an integrated services digital network (ISDN) card. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local network 1115 (e.g., a LAN) or through equipment operated by a service provider, which provides communication services through a communications network 1110. The local network 1114 and the communications network 1110 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the computer system 1101 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1101 can transmit and receive data, including program code, through the network(s) 1115 and 1110, the network link 1114 and the communication interface 1113. Moreover, the network link 1114 may provide a connection through a LAN 1115 to vehicle, operator station, a mobile device 1107 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

Furthermore, the foregoing discussion discloses and describes merely exemplary embodiments of the present invention. As will be understood by those skilled in the art, the present disclosure may be embodied in other specific forms without departing from the spirit or essential characteristics thereof. Accordingly, the present disclosure is intended to be illustrative and not limiting of the scope, as well as the claims. Moreover, it must be appreciated that the techniques described herein are in no way limited to be applicable only to a storage warehouse setting. Rather, the techniques may be equally applicable in any factory setting. For example, the n-deep storage configuration described herein maximizes storage density while reducing the adverse impact on retrieval time of items. Accordingly, the storage configuration described herein may be applicable to a parking garage, where a root may be configured to retrieve vehicles from particular locations within the storage model. The disclosure, including any readily discernible variants of the teachings herein, defines in part, the scope of the foregoing claim terminology such that no subject matter is dedicated to the public. Additionally, the above disclosure also encompasses the embodiments listed below:

(1) A method of selecting a storage location for an item, the method being performed by a server including circuitry, the method comprising: obtaining by the circuitry, order information for a plurality of previously fulfilled orders, each order of the plurality of previously fulfilled orders including at least one item; calculating, based on the obtained order information, one or a combination of an affinity value of the item, and a popularity value of the item, the affinity value of the item being calculated with respect to at least one other item; determining a plurality of available storage locations where the item can be stored, each available storage location corresponding to one of a plurality of storage racks and a position on a shelf of the one of the plurality of storage racks; calculating, for each available storage location, one or a combination of an affinity score of the storage rack corresponding to the respective available storage location with respect to the item, and a popularity score of the storage rack corresponding to the respective available storage location; selecting the storage location from the available storage locations based on at least one of the calculated affinity score of the storage rack corresponding to the selected storage location, and the calculated popularity score of the storage rack corresponding to the selected storage location; and instructing a vehicle to store the item at the selected storage location.

(2) The method of (1), wherein the affinity value of the item calculated with respect to the at least one other item indicates a likelihood in which an order of the plurality of previously fulfilled orders includes the item and the at least one other item, and the popularity value of the item indicates a number of times the item is included in the plurality of previously fulfilled orders.

(3) The method of (1), further comprising: generating, based on dimensions of the item, a cuboid that completely encapsulates the item, a volume of the generated cuboid indicating an amount of space required to store the item.

(4) The method of (3), wherein the plurality of available storage locations is determined based on a predetermined number of orientations of the generated cuboid.

(5) The method of (1), wherein the popularity score of the storage rack corresponding to the respective available storage location is calculated as an average of the popularity values of items stored in the storage rack.

(6) The method of (1), wherein the step of selecting the storage location comprises: selecting the storage location based on a difference between the popularity score of the storage location and the popularity value of the item.

(7) The method of (1), wherein the affinity score of the storage rack with respect to the item is calculated as an average of affinity values of each combination of the item with items stored in the storage rack.

(8) A non-transitory computer-readable medium storing instructions which when executed by a computer causes the computer to perform a method of selecting a storage location for an item, the method comprising: obtaining order information for a plurality of previously fulfilled orders, each order of the plurality of previously fulfilled orders including at least one item; calculating, based on the obtained order information, one or a combination of an affinity value of the item, and a popularity value of the item, the affinity value of the item being calculated with respect to at least one other item; determining a plurality of available storage locations where the item can be stored, each available storage location corresponding to one of a plurality of storage racks and a position on a shelf of the one of the plurality of storage racks;

calculating, for each available storage location, one or a combination of an affinity score of the storage rack corresponding to the respective available storage location with respect to the item, and a popularity score of the storage rack corresponding to the respective available storage location; selecting the storage location from the available storage locations based on at least one of the calculated affinity score of the storage rack corresponding to the selected storage location, and the calculated popularity score of the storage rack corresponding to the selected storage location; and instructing a vehicle to store the item at the selected storage location.

(9) The non-transitory computer-readable medium of (8), wherein the affinity value of the item calculated with respect to the at least one other item indicates a likelihood in which an order of the plurality of previously fulfilled orders includes the item and the at least one other item, and the popularity value of the item indicates a number of times the item is included in the plurality of previously fulfilled orders.

(10) The non-transitory computer-readable medium of (8), the method further comprising: generating, based on dimensions of the item, a cuboid that completely encapsulates the item, a volume of the generated cuboid indicating an amount of space required to store the item.

(11) The non-transitory computer-readable medium of (10), wherein the plurality of available storage locations is determined based on a predetermined number of orientations of the generated cuboid.

(12) The non-transitory computer-readable medium of (8), wherein the popularity score of the storage rack corresponding to the respective available storage location is calculated as an average of the popularity values of items stored in the storage rack.

(13) The non-transitory computer-readable medium of (8), wherein the step of selecting the storage location comprises: selecting the storage location based on a difference between the popularity score of the storage location and the popularity value of the item.

(14) The non-transitory computer-readable medium of (8), wherein the affinity score of the storage rack with respect to the item is calculated as an average of affinity values of each combination of the item with items stored in the storage rack.

(15) An information processing apparatus, comprising: circuitry configured to obtain order information for a plurality of previously fulfilled orders, each order of the plurality of previously fulfilled orders including at least one item, calculate based on the obtained order information, one or a combination of an affinity value of the item, and a popularity value of the item, the affinity value of the item being calculated with respect to at least one other item; determine a plurality of available storage locations where the item can be stored, each available storage location corresponding to one of a plurality of storage racks and a position on a shelf of the one of the plurality of storage racks, calculate, for each available storage location, one or a combination of an affinity score of the storage rack corresponding to the respective available storage location with respect to the item, and a popularity score of the storage rack corresponding to the respective available storage location, select the storage location from the available storage locations based on at least one of the calculated affinity score of the storage rack corresponding to the selected storage location, and the calculated popularity score of the storage rack corresponding to the selected storage location, and instruct a vehicle to store the item at the selected storage location.

(16) The information processing apparatus of (15), wherein the affinity value of the item calculated with respect to the at least one other item indicates a likelihood in which an order of the plurality of previously fulfilled orders includes the item and the at least one other item, and the popularity value of the item indicates a number of times the item is included in the plurality of previously fulfilled orders.

(17) The information processing apparatus of (15), wherein the circuitry is configured to: generate, based on dimensions of the item, a cuboid that completely encapsulates the item, a volume of the generated cuboid indicating an amount of space required to store the item.

(18) The information processing apparatus of (17), wherein the plurality of available storage locations is determined based on a predetermined number of orientations of the generated cuboid.

(19) The information processing apparatus of (15), wherein the popularity score of the storage rack corresponding to the respective available storage location is calculated as an average of the popularity values of items stored in the storage rack.

(20) The information processing apparatus of (15), wherein the circuitry is configured to: select the storage location based on a difference between the popularity score of the storage location and the popularity value of the item.

(21) The information processing apparatus of (15), wherein the affinity score of the storage rack with respect to the item is calculated as an average of affinity values of each combination of the item with items stored in the storage rack.

The invention claimed is:

1. A method of selecting a storage location for an item, the method being performed by a server including a processor, the method comprising:

obtaining by the processor, order information for a plurality of previously fulfilled orders, each order of the plurality of previously fulfilled orders including at least one item;

calculating, by the processor based on the obtained order information, a combination of (i) an affinity value of the item, and (ii) a popularity value of the item, the affinity value of the item being calculated with respect to at least one other item;

determining, by the processor, a plurality of available storage locations where the item can be stored, each available storage location corresponding to one of a plurality of storage racks and a position on a shelf of the one of the plurality of storage racks;

calculating, by the processor for each available storage location, a combination of (i) an affinity score of the storage rack corresponding to the respective available storage location based on the affinity value of the item, and (ii) a popularity score of the storage rack corresponding to the respective available storage location based on the popularity value of the item;

selecting, by the processor, the storage location from the available storage locations based on a combination of (i) the calculated affinity score of the storage rack corresponding to the selected storage location, and the (ii) calculated popularity score of the storage rack corresponding to the selected storage location; and instructing a vehicle to store the item at the selected storage location.

2. The method of claim 1, wherein the affinity value of the item calculated with respect to the at least one other item indicates a likelihood in which an order of the plurality of previously fulfilled orders includes the item and the at least one other item, and the popularity value of the item indicates a number of times the item is retrieved for the plurality of previously fulfilled orders.

3. The method of claim 1, wherein the popularity score of the storage rack corresponding to the respective available storage location is calculated as an average of the popularity values of items stored in the storage rack.

4. The method of claim 1, wherein the step of selecting the storage location comprises:
selecting the storage location based on a difference between the popularity score of the storage location and the popularity value of the item.

5. The method of claim 1, wherein the affinity score of the storage rack with respect to the item is calculated as an average of affinity values of each combination of the item with items stored in the storage rack.

6. The method of claim 1, further comprising:
generating, based on dimensions of the item, a cuboid that completely encapsulates the item, a volume of the generated cuboid indicating an amount of space required to store the item.

7. The method of claim 6, wherein the plurality of available storage locations is determined based on a predetermined number of orientations of the generated cuboid.

8. A non-transitory computer-readable medium storing instructions which when executed by a computer causes the computer to perform a method of selecting a storage location for an item, the method comprising:
obtaining order information for a plurality of previously fulfilled orders, each order of the plurality of previously fulfilled orders including at least one item;
calculating, based on the obtained order information, a combination of (i) an affinity value of the item, and (ii) a popularity value of the item, the affinity value of the item being calculated with respect to at least one other item;
determining a plurality of available storage locations where the item can be stored, each available storage location corresponding to one of a plurality of storage racks and a position on a shelf of the one of the plurality of storage racks;
calculating, for each available storage location, a combination of (i) an affinity score of the storage rack corresponding to the respective available storage location based on the affinity value of the item, and (ii) a popularity score of the storage rack corresponding to the respective available storage location based on the popularity value of the item;
selecting the storage location from the available storage locations based on a combination of (i) the calculated affinity score of the storage rack corresponding to the selected storage location, and (ii) the calculated popularity score of the storage rack corresponding to the selected storage location; and
instructing a vehicle to store the item at the selected storage location.

9. The non-transitory computer-readable medium of claim 8, wherein the affinity value of the item calculated with respect to the at least one other item indicates a likelihood in which an order of the plurality of previously fulfilled orders includes the item and the at least one other item, and the popularity value of the item indicates a number of times the item is retrieved for the plurality of previously fulfilled orders.

10. The non-transitory computer-readable medium of claim 8, wherein the popularity score of the storage rack corresponding to the respective available storage location is calculated as an average of the popularity values of items stored in the storage rack.

11. The non-transitory computer-readable medium of claim 8, wherein the step of selecting the storage location comprises:
selecting the storage location based on a difference between the popularity score of the storage location and the popularity value of the item.

12. The non-transitory computer-readable medium of claim 8, wherein the affinity score of the storage rack with respect to the item is calculated as an average of affinity values of each combination of the item with items stored in the storage rack.

13. The non-transitory computer-readable medium of claim 8, the method further comprising:
generating, based on dimensions of the item, a cuboid that completely encapsulates the item, a volume of the generated cuboid indicating an amount of space required to store the item.

14. The non-transitory computer-readable medium of claim 13, wherein the plurality of available storage locations is determined based on a predetermined number of orientations of the generated cuboid.

15. An information processing apparatus, comprising:
a processor configured to:
obtain order information for a plurality of previously fulfilled orders, each order of the plurality of previously fulfilled orders including at least one item,
calculate based on the obtained order information, a combination of (i) an affinity value of the item, and (ii) a popularity value of the item, the affinity value of the item being calculated with respect to at least one other item;
determine a plurality of available storage locations where the item can be stored, each available storage location corresponding to one of a plurality of storage racks and a position on a shelf of the one of the plurality of storage racks,
calculate, for each available storage location, a combination of (i) an affinity score of the storage rack corresponding to the respective available storage location based on the affinity value of the item, and (ii) a popularity score of the storage rack corresponding to the respective available storage location based on the popularity value of the item,
select the storage location from the available storage locations based on a combination of (i) the calculated affinity score of the storage rack corresponding to the selected storage location, and (ii) the calculated popularity score of the storage rack corresponding to the selected storage location, and
instruct a vehicle to store the item at the selected storage location.

16. The information processing apparatus of claim 15, wherein the affinity value of the item calculated with respect to the at least one other item indicates a likelihood in which an order of the plurality of previously fulfilled orders includes the item and the at least one other item, and the popularity value of the item indicates a number of times the item is retrieved for the plurality of previously fulfilled orders.

17. The information processing apparatus of claim 15, wherein the popularity score of the storage rack corresponding to the respective available storage location is calculated as an average of the popularity values of items stored in the storage rack.

18. The information processing apparatus of claim 15, wherein the circuitry is configured to:
select the storage location based on a difference between the popularity score of the storage location and the popularity value of the item.

19. The information processing apparatus of claim 15, wherein the affinity score of the storage rack with respect to the item is calculated as an average of affinity values of each combination of the item with items stored in the storage rack.

20. The information processing apparatus of claim 15, wherein the circuitry is configured to:
   generate, based on dimensions of the item, a cuboid that completely encapsulates the item, a volume of the generated cuboid indicating an amount of space required to store the item.

21. The information processing apparatus of claim 20, wherein the plurality of available storage locations is determined based on a predetermined number of orientations of the generated cuboid.

* * * * *